(12) United States Patent
Yu et al.

(10) Patent No.: US 7,416,002 B2
(45) Date of Patent: Aug. 26, 2008

(54) REINFORCED PNEUMATIC TIRE INCLUDING COMPOSITE FABRIC PLY IN AT LEAST TIRE SHOULDERS

(75) Inventors: Jenny Zhaoxia Yu, Dublin, OH (US); David Mark Frantz, Norton, OH (US); Leonard James Reiter, Norton, OH (US); Robert Anthony Neubauer, Medina, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 437 days.

(21) Appl. No.: 11/147,948

(22) Filed: Jun. 8, 2005

(65) Prior Publication Data

US 2006/0278321 A1 Dec. 14, 2006

(51) Int. Cl.
*B60C 9/00* (2006.01)
*B60C 9/10* (2006.01)
*B60C 9/11* (2006.01)
*B60C 9/18* (2006.01)
*B60C 13/00* (2006.01)
*B60C 19/12* (2006.01)

(52) U.S. Cl. ........................ 152/197; 152/526; 152/538; 152/550; 152/554; 152/563; 152/DIG. 14

(58) Field of Classification Search ......... 152/196–198, 152/200, 202, 526, 538, 550, 554, 555, 563, 152/DIG. 14
See application file for complete search history.

(56) References Cited

U.S. PATENT DOCUMENTS

| 1,227,427 | A | * | 5/1917 | Grabau et al. | ............ | 152/563 X |
| 2,083,003 | A | * | 6/1937 | Budd | ...................... | 152/197 X |
| 6,427,728 | B1 | | 8/2002 | Maguire et al. | | |
| 6,595,256 | B1 | * | 7/2003 | Bernstorf et al. | ........ | 152/554 X |
| 6,634,398 | B1 | * | 10/2003 | Malin et al. | ............. | 152/526 X |

FOREIGN PATENT DOCUMENTS

| EP | 0 131 954 A2 | * | 1/1985 |
| JP | 64026751 A | * | 1/1989 |

* cited by examiner

*Primary Examiner*—Adrienne C Johnstone
(74) *Attorney, Agent, or Firm*—Robert N. Lipcsik

(57) ABSTRACT

A pneumatic tire has a pair of shoulder portions extending between a tread portion and opposed sidewall portions. The tire has at least one ply of a composite fabric. The composite fabric has three layers with the middle layer comprising a plurality of straight warp yarns wherein the three layers are bound together with binder yarns. At a minimum, the composite fabric ply is located in the tire shoulders.

4 Claims, 8 Drawing Sheets

REINFORCED PNEUMATIC TIRE INCLUDING COMPOSITE FABRIC PLY IN AT LEAST TIRE SHOULDERS

FIELD OF THE INVENTION

The present invention is directed to an improved puncture resistance tire. More specifically, the invention is a pneumatic tire having improved puncture resistant and durability characteristics.

BACKGROUND OF THE INVENTION

Pneumatic tires are constructed with multiple types of plies, each ply performing different functions and providing different physical properties to the tire. The carcass reinforcing ply provides strength and shape to the tire. Belt plies, or layers, provide hoop restraint to the tire, as well as strength and cut resistance to the tire.

Many type of vehicles are driven in rugged road conditions, from the off-road enthusiast in a truck or all terrain vehicle to massive earthmover vehicles. The commonality experienced by these vehicles is the potential for tire cuts and rock penetration.

SUMMARY OF THE INVENTION

The present invention is directed towards improving the durability, cut resistance, and rock penetration properties of any tire that is employed in rugged road conditions.

The present invention is directed towards a pneumatic tire comprising a tread portion, a belt package radially beneath the tread portion, a pair of sidewall portions, a pair of shoulder portions with each shoulder portion extending between the tread portion and each sidewall portion, a pair of bead portions with a bead core therein, and a carcass comprising at least one carcass ply extending between the bead portions and turnup up around the bead core in each bead portion to form two turnup portions and a main portion therebetween. The tire has at least one ply of a composite fabric. The composite fabric has three layers with the middle layer comprising a plurality of straight warp yarns wherein the three layers are bound together with binder yarns. At a minimum, the composite fabric ply is located in the tire shoulders.

The outer layers of the composite fabric ply may be woven in any conventional weave pattern or may be formed of only weft yarns. Optionally, the straight warp yarns of the middle layer have a cord diameter of 0.25 to 4 mm. The yarns forming the three layers and the binder yarns of the composite fabric are selected from the group consisting of polyester, nylon, aramid, PET, PEN, and blends thereof. In weaving the composite fabric, different yarn types may be combined to form the different layers.

The composite fabric ply may be located between the carcass ply and the belt package. Alternatively, the composite fabric may be located radially outward of the belt package. If desired to achieve particular tire characteristics, multiple layers of the composite fabric may form the entire belt package.

The composite fabric ply may extend continuously from one shoulder portion to the opposing shoulder portion or may be formed as separate reinforcing strips. The radially inner ends of the composite fabric, in the form of either the axially continuous ply or the spaced reinforcing strips, may be located radially outward of the maximum section width of the tire or adjacent the turnup portion of the carcass. In one embodiment, the radially inner end of the composite fabric ply is spaced from the maximum section width of the tire by a distance Y in the range of 5-30% of the section height of the tire. Alternatively, when formed as an axially continuous ply, the composite fabric ply has an axial width CW in the range of 60-110% the belt package width BW.

When formed as spaced strips, the axially inner end of each composite fabric ply strip is located radially outward or radially inward of the belt package. Also, the composite fabric ply strips overlap the belt package by an axial width of 10 to 25% of the belt package width BW.

Additionally, when formed as strips in the sidewalls of the tire, the composite fabric ply strips may be identified as having a length IF of 20 to 45% of the length CL of the carcass ply, wherein the length IF is actual length of the composite fabric ply strip and the length CL is the length of the main portion of the carcass ply.

In another disclosed embodiment, the pneumatic tire of claim may have both a composite fabric ply that extends continuously from one shoulder portion to the opposing shoulder portion and composite fabric ply strips in each tire sidewall.

DEFINITIONS

The following definitions are applicable to the present disclosure and are used consistently as defined below:

"Axial" and "axially" are used herein to refer to lines or directions that are parallel to the axis of rotation of the tire;

"Bead base" means the portion of the bead that forms its inside diameter;

"Bead base line" means the line perpendicular to the equatorial plane of the tire that contact the bead base;

"Binder Yarn" means yarn that is used to bind together different yarns in a fabric;

"Circumferential" means lines or directions extending along the perimeter of the surface of the annular tire parallel to the Equatorial Plane (UP) and perpendicular to the axial direction;

"Equatorial plane (UP)" means the plane perpendicular to the tire's axis of rotation and passing through the center of its tread;

"Fabric" means a network of essentially unidirectionally extending cords/yarns, which may be twisted, and which may in turn be composed of a plurality of a multiplicity of filaments (which may also be twisted). The fabric is woven and flexible;

"Radial" and "radially" are used to mean directions radially toward or away from the axis of rotation of the tire;

"Yarn": a generic term for a continuous strand of textile fibers or filaments. Yarn occurs in the following forms:
1) a number of fibers twisted together;
2) a number of filaments laid together without twist;
3) a number of filaments laid together with a degree of twist;
4) a single filament with or without twist (monofilament);

"Filament Yarn" denotes yarn that is formed of continuous and equal length strands;

"Spun Yarn" denotes yarn that is formed of a plurality of stands of unequal lengths twisted together to form a yarn;

"Warp" refers to a network of essentially unidirectional extending cords/yarns, which extend in the longitudinal direction of the belt;

"Weft" (filling) refers to the cord/yarn placed at right angles to the warp cords/yarns;

"Woven Fabric" refers to the interlacing of two sets of yarn, the warp and weft yarns, at right angles;

"Plain Weave" refers to a type of weave wherein each warp yarn interlaces one yarn at a time with each weft yarn and vise versa. Plain weave fabric has the same appearance on both sides of the fabric;

"Twill Weave" refers to a type of weave wherein there are fewer interlacings between the warp and weft yarns than plain weave fabrics. Twill weaves are characterized by diagonal lines on the fabric;

"TPI" or "tpi" means turns per inch and refers to the number of twists of a yarn; one turn per inch is equivalent to 0.394 turns per centimeter;

"EPI" or "epi" means ends per inch and refers to the number of yarns in a given inch of fabric or calendered cord; one end per inch is equivalent to 0.394 ends per centimeter.

BRIEF DESCRIPTION OF THE DRAWINGS

The invention will be described by way of example and with reference to the accompanying drawings in which.

DETAILED DESCRIPTION OF THE INVENTION

The following language is of the best presently contemplated mode or modes of carrying out the invention. This description is made for the purpose of illustrating the general principals of the invention and should not be taken in a limiting sense. The scope of the invention is best determined by reference to the appended claims.

Figure 1:
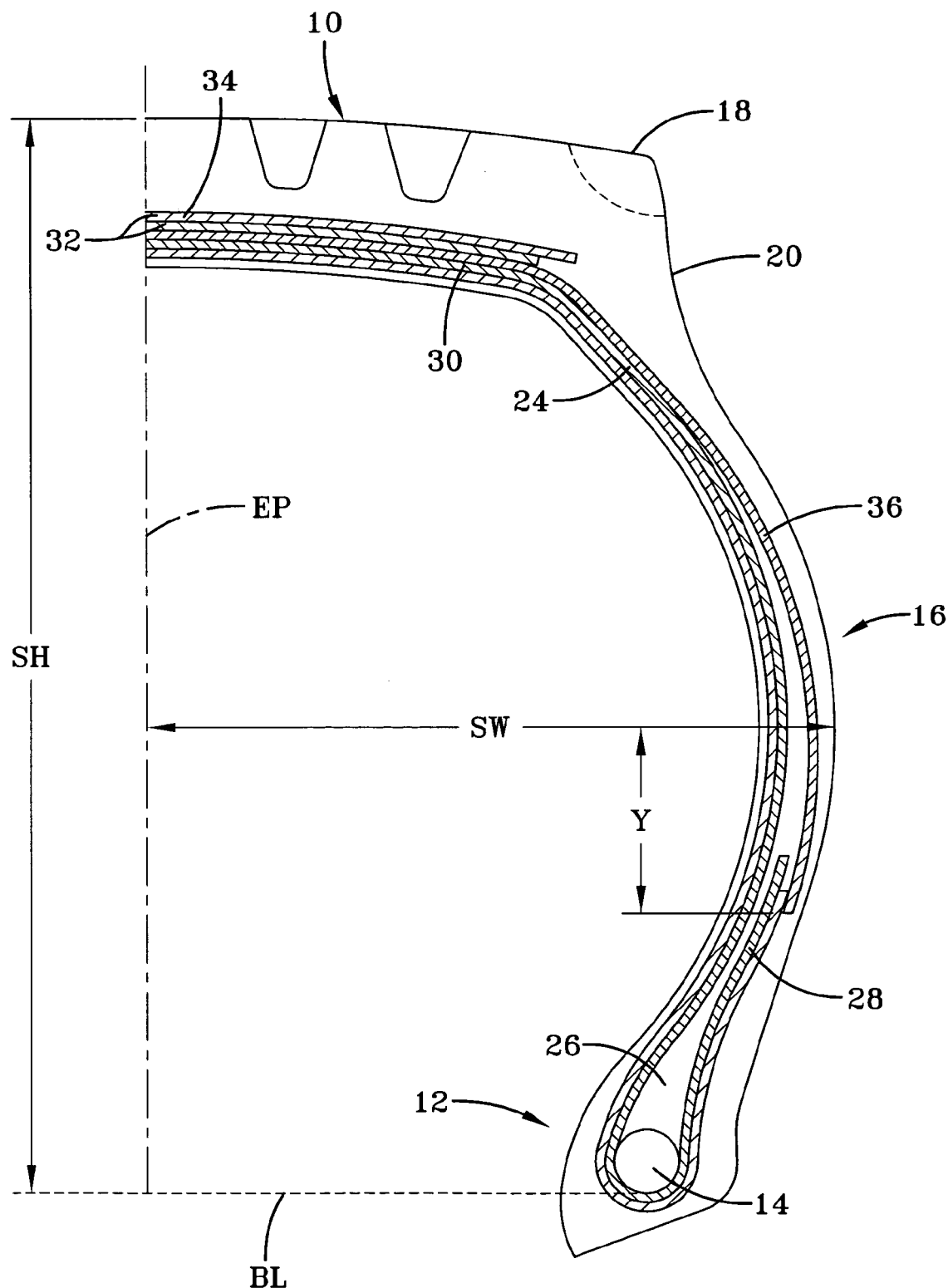
FIG. 1 is a cross-sectional view of a tire.

Illustrated in FIG. 1 is a cross sectional view of a tire constructed in accordance with the invention. The non-illustrated half of the tire is symmetrical to that illustrated, unless specifically identified otherwise. While one type of tire cross-sectional profile and basic internal construction is illustrated, the disclosed invention may be applicable for a light truck tires, radial medium tires, heavy load tire, industrial tires, off-the-road tires, mining tires, agricultural tires, all-terrain tires, aircraft tires, or other types of tires. One skilled in the art will appreciate that for each type of tire, the tire cross-sectional profile, the tread configuration, and materials of construction will be selected for the desired performance of the tire and may not be identical to what is illustrated.

The tire has a tread portion 10, a pair of axially spaced bead portions 12 with a bead core 14 therein, and a pair of sidewall portions 16 extending radially inwardly from the tread edges 18 to the bead portions 12. The locations where the tread portion 10 and the sidewall portions 16 connect are the shoulder areas 20. A toroidal carcass has at least one reinforcing ply 24 extending between the bead portions 12. The carcass ply 24 is turned up around the bead cores 14 and the apex 26, forming turnup portions 28 and a main carcass portion 30 therebetween. Radially outward of the main carcass portion 30 and inward of the tread 10 is a belt package 32. The tire has a defined sectional height SH measured from the bead base line BL to the top of the tread at the tire equatorial plane UP. The tire has a maximum sectional width SW.

The carcass has at least one reinforcing ply 24, and may have more plies, depending on the tire's ultimate end use. For the large tire illustrated, the carcass is comprised of two reinforcing plies 24. The ends of the turnup portions 28 of each ply are radially staggered.

The belt package 32 has at least two reinforcing plies 34. The plies 34 are formed of parallel reinforcing cords, inclined at angles in the range of 15° to 35° with respect to the equatorial plane of the tire; such plies 34 are often referred to as working plies. The cords in each ply 34 are inclined at the same angle, but in opposite direction from one another. Additional plies may be located above or below the two illustrated plies 34 and include the possibility of being inclined at a nominal angle, 0°-5°, relative to the equatorial plane of the tire or at an angle greater than the working plies 34. The cords of the belt plies 34, and any additional plies, may be any cords conventional used for reinforcement layers in the belt region of a tire.

In accordance with one aspect of the invention, located outward of the carcass plies 24 is a reinforcing ply 36 located, at a minimum, in the shoulder portions 16 of the tire. As seen in FIG. 1, the reinforcing ply 36 extends underneath the belt package 32, through the shoulder 20 and into the sidewall 16. The ply 36 terminates in the lower sidewall, adjacent to the carcass ply turnup 28. As the tire is symmetrical, the ply 36 extends from one shoulder 20 to the opposing shoulder 20. The ply 36 terminates at a distance Y equivalent to 5 to 30% of the tire section height SH from the maximum width SW of the tire.

Figure 4:
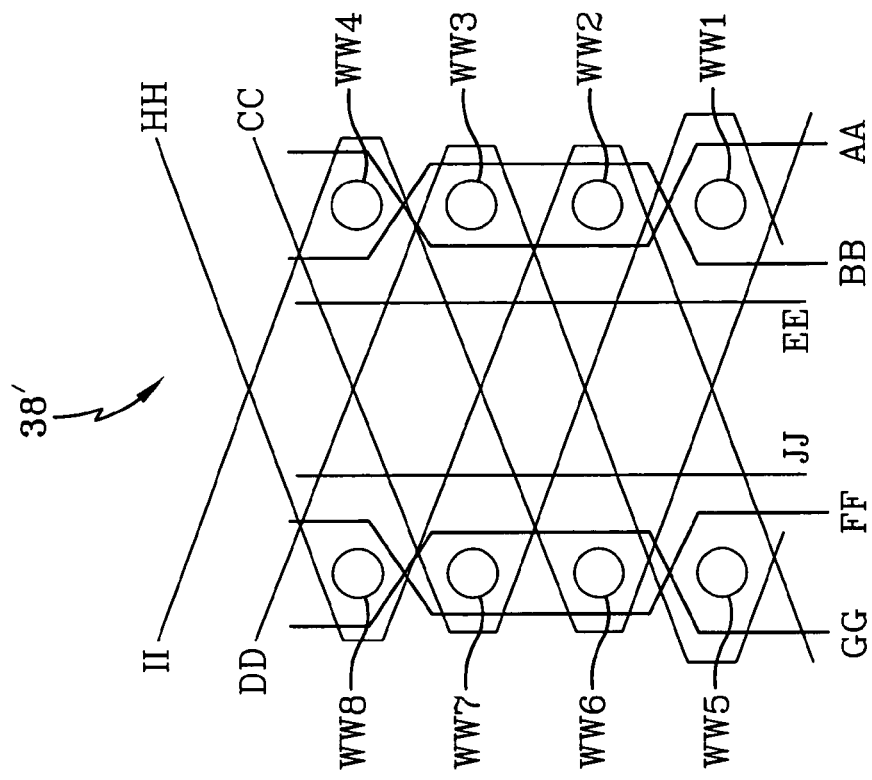
FIGS. 4-5 are alternative weaving patterns of the fabric.
Figure 2:
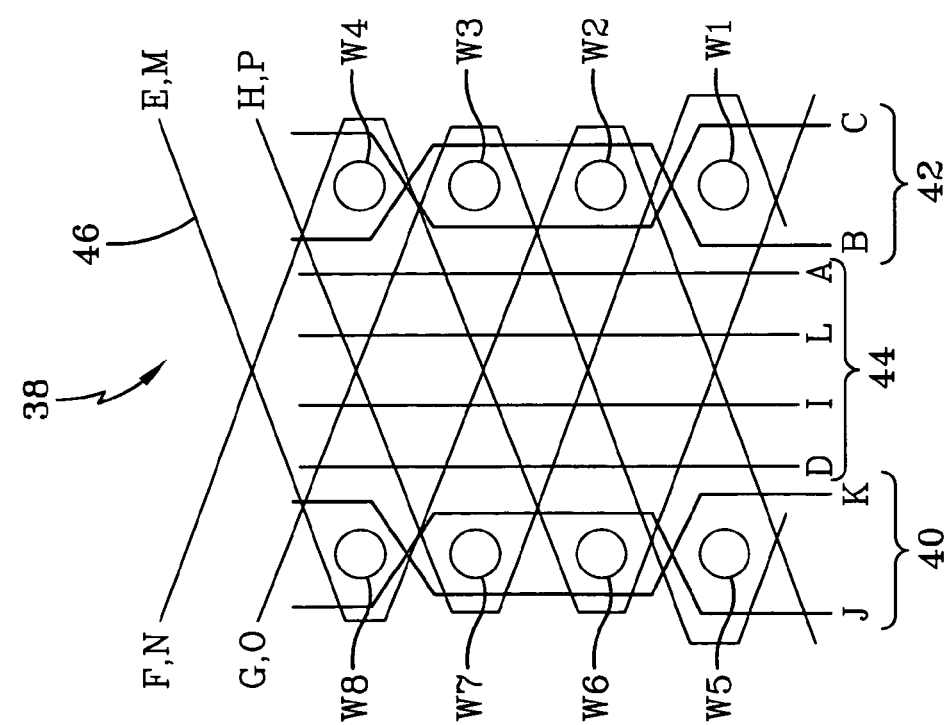
FIG. 2 is a weaving pattern of the composite fabric
Figure 3:
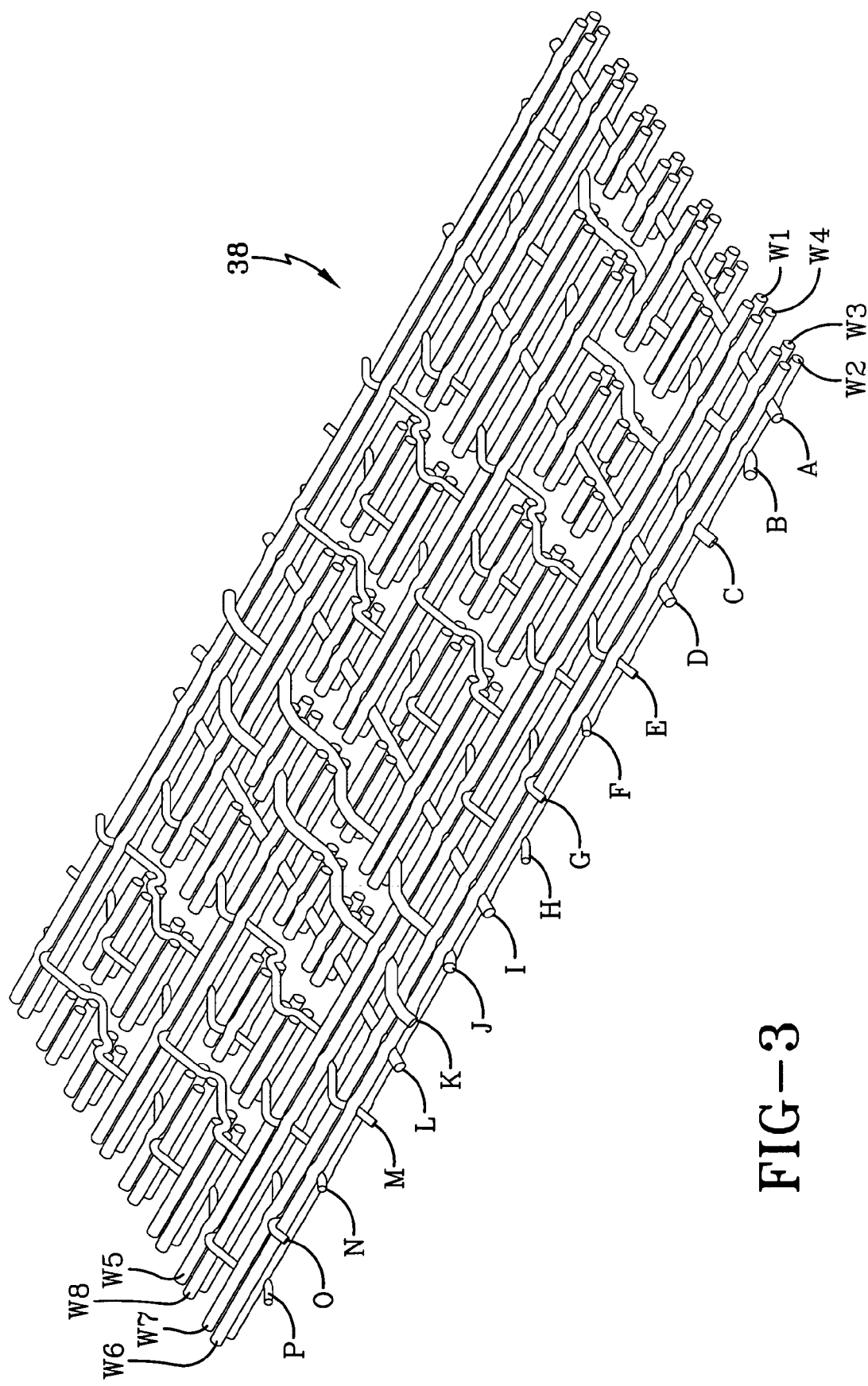
FIG. 3 is a schematic showing the weaving order of the composite fabric.

The ply 36 is formed from a composite fabric 38, the fabric 38 being illustrated in FIGS. 2-4. The composite fabric 38 is substantially similar to the composite fabric disclosed in U.S. Pat. No. 6,427,728, which is fully incorporated herein by reference. The fabric 38 is a composite of two woven layers 40, 42 and an intermediate layer 44. The three layers 40, 42, 44 are bound together with binder yarns 46 prior to any encapsulation of the fabric 38 or individual layers 40, 42, 44 in an elastomeric compound. The individual yarns and layers, and the weaving pattern of the composite fabric 38 are shown in FIGS. 2-4.

FIG. 2 illustrates a weaving card pattern for the composite fabric 38. Each woven layer 40, 42 is defined by a set of repeating four weft yarns W1-W4 or W5-W8, with warp yarns B, C or J,K interlacing the weft yarns W1-W4 or W5-W8 in a twill pattern. Between the woven layers 40, 42 are the straight warp yarns A, D, I, L, forming the intermediate layer 44. Tying the three layers 40, 42, 44 intimately together, and causing the three layers to contact each other, are binder yarns E-H and M-P. Each binder yarn E-H, M-P extends from a first woven layer 40 or 42 to the other woven layer 42 or 40.

An exploded view of the fabric 38 is seen in FIG. 3, showing the weaving order. The weft yarns W1-W4 and W5-W8 of each woven layer 40,42 are laid in adjacent layers. A first straight warp yarn A is laid between the weft yarns W1-W8. Warp yarns B, C are woven about weft yarns W1-W4 in a twill pattern, forming the first woven layer 40. A second straight warp yarn D is laid between the weft yarns W1-W8. A set of four binder yarns E-H is woven between the weft yarns W1-W8. Each binder yarn E-H extends from around only one weft yarn in a first woven layer 40 or 42 to only one weft yarn in a second woven layer 42 or 40. A third straight warp yarn I is laid between the weft yarns W1-W8. Warp yarns J, K are woven about weft yarns W5-W8 in a twill pattern, forming the second woven layer 42. A fourth straight warp yarn L is laid between the weft yarns W1-W8. A set of four binder yarns M-P is woven between the weft yarns W1-W8 similar to the first set of binder yarns E-H. As seen, after weaving, the warp yarns A, D, I, L of the intermediate layer 44 remain straight, while the weft yarns of the outer layers 40, 42 obtain a small repetitive crimping due to the interaction with the other yarns.

The composite fabric 38 may also be produced using less straight warp and binder yarns 46 than that described so far. FIG. 4 illustrates the weaving pattern of a different embodiment 38' of the inventive fabric. Similar to that disclosed, the fabric 38' is a composite of two woven layers with an intermediate layer formed of straight warp yarns, but with fewer straight warp yarns and fewer binder yarns. The total number of straight and surface warp yarns per inch is identical for the two fabric embodiments 38 and 38'.

The composite fabric may be also modified to provide less than the illustrated two intermediate layer straight warp yarns or more than the illustrated four intermediate layer straight warp yarns. The number of intermediate layer straight warp yarns is dependent upon the yarn cord diameter, the type of material used and the desired physical properties of the fabric.

The cord diameters for the straight warp yarns of the intermediate layer 44 and the woven warp yarns of the outer woven layers 40, 42 are in the range of 0.25 to 2.0 mm, preferably 0.25 to 1.5 mm. The ratio of the cord diameter of the straight warp yarns of the intermediate layer 44 to the cord diameter of the woven warp yarns of the outer woven layers 40, 42 is 1.25 to 0.75, preferably 1.10 to 0.90. The weft yarns of the outer layers 40, 42 and the binder yarns 46 have an approximate diameter equal to 1.0-0.25 times the diameter of the straight warp yarns of the intermediate layer 44 and woven warp yarns of the outer woven layers 40, 42.

Because of the diameter ratios of the straight warp yarns of the intermediate layer 44 and woven warp yarns of the outer layers 40, 42, the relative denier strength of the yarns, and the pattern draft of the fabric, each distinct layer in the composite fabric, the two woven layers 40, 42 and the intermediate layer 44, contributes significantly to the physical properties of the fabric 38. Each layer 40, 42, 44 contributes approximately 25-40% of the overall strength of the fabric 38. The fabric 38 is stronger in the warp direction than the weft direction.

The fabric 38 exhibits puncture resistance, high rip resistance, transverse tear resistance, impact resistance, anti-fraying, and flexibility.

To increase the properties of the fabric in the weft direction, the fabric 38 may be modified in the following manner. The weft yarns W1-W8, WW1-WW8 of each woven layer 40, 42 may be selectively replaced with monofilaments. Monofilament content of each woven layer 40, 42 may range from 10 to 75%. For 25% monofilament yarn content, every fourth weft yarn is a monofilament while the remaining weft yarns are spun or filament yarns. For 33% monofilament yarn content, every third weft yarn is a monofilament while the remaining weft yarns are spun or filament yarns.

Any conventional yarn may be selected for the various yarns of the composite fabric 38. Such materials include aramid, polyester, PET, PEN, nylon, or blends thereof. Within the composite fabric 38, the different yarns of the different layers 40, 42, 44 may be formed of different materials. For example, the binder and weft yarns may be formed of nylon while the warp yarns of the three layers 40, 42, 44 may be formed of aramid. Selective determination of the yarn materials for the different layers or differently functioning yarns can be used to tune the strength characteristics of the fabric 38.

Since the warp yarns of the intermediate layer 44 remain straight after weaving, the inclination angle of the straight warp yarns of the intermediate layer 44 can be used to define the inclination angle placement of the fabric 38 within the tire.

In the tire of FIG. 1, the fabric 38 of the reinforcing ply 36 is inclined at an angle of 0° to 90° relative to the circumferential direction of the tire. When the fabric 38 is inclined at angles of approximately 0° to 20° relative to the circumferential direction of the tire, the reinforcing ply 36 may be divided into multiple sections along the circumferential length of the tire. By dividing the ply 36 into sections, having lengths of ⅓ to ⅛ times the circumferential length of the tire, it enables the tire to expand during building and curing, while maintaining the desired hoop characteristics provided by the ply.

Preferably, the fabric 38 of the ply 36 is inclined at angles of 30° to 75°. In this angle range and greater, i.e. 75°-90°, the ply may extend continuously about the circumference of the tire. For larger sized tires, such as OTR tires, multiple plies of the composite fabric 38 may be provided. When using multiple plies of the composite fabric 38, the composite fabric plies may be directly adjacent to each other, or may envelope other layers in the tire structure, such as the carcass reinforcing plies or the belt plies.

The selection of an inclination angle for the reinforcing ply 36 may also be dependent upon the width of the reinforcing ply and the desired puncture resistance and increased durability of the tire.

For the tire of FIG. 1, the reinforcing ply 36 extends continuously from one shoulder 20 to the opposing shoulder 20, with the ends terminating in the lower sidewalls adjacent the carcass turnup portions 28. The reinforcing ply 36 is preferably inclined at an angle in the range of 30°-75°.

Figure 5:
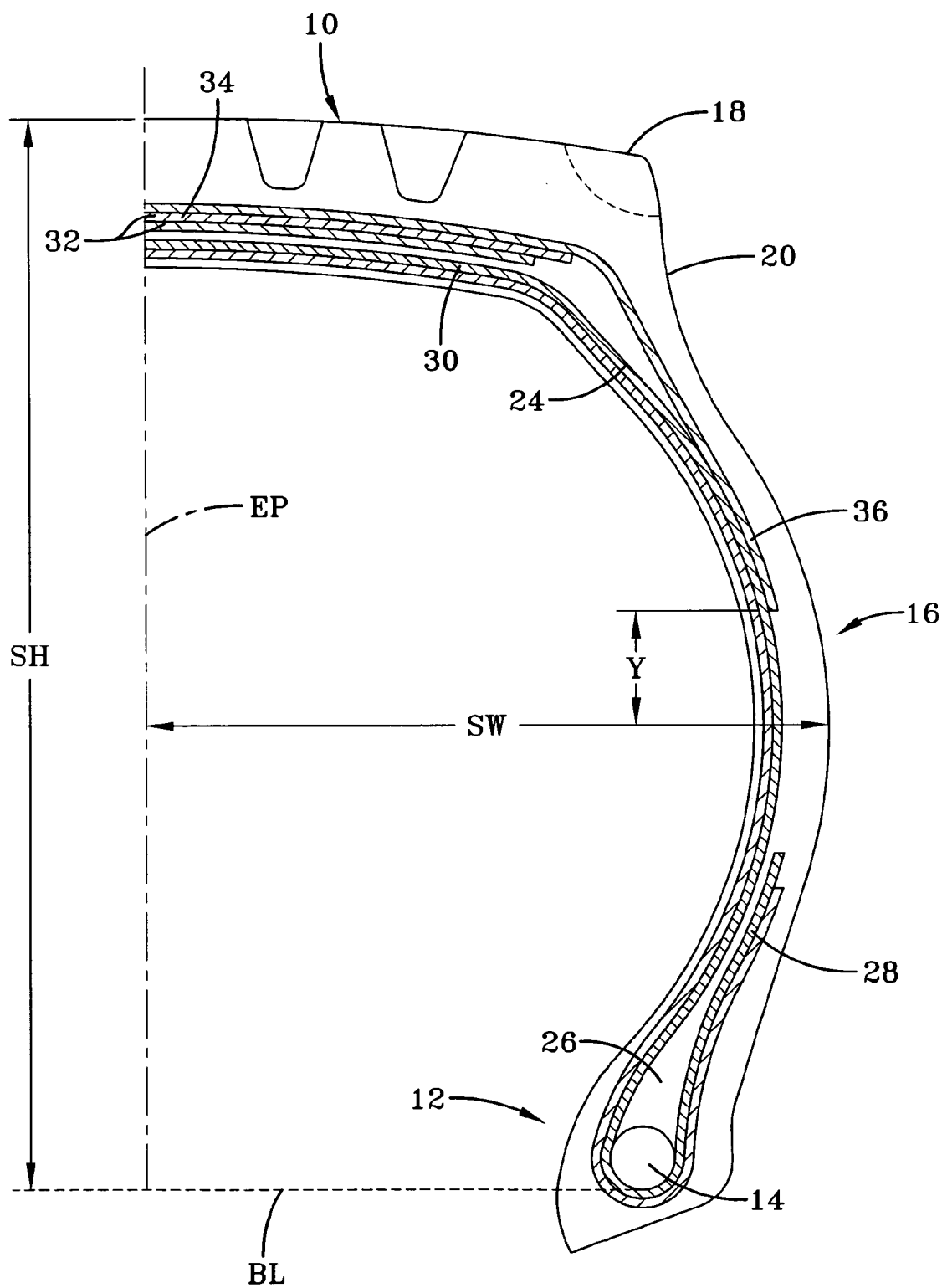

In the tire of FIG. 5, the reinforcing ply 36 extends continuously from one shoulder 20 to the opposing shoulder 20. However, the ends of the ply 36 terminate radially outward of the carcass turnup portions 28. In this construction, the radially inner ends of the reinforcing ply 36 are measured relative to the maximum width SW of the tire. Herein, the reinforcing ply 36 terminates a distance Y equivalent to 5 to 30% of the section height SH of the tire from the maximum width SW of the tire. Also, the ply 36 is located radially outward of the belt package 32.

Figure 6:
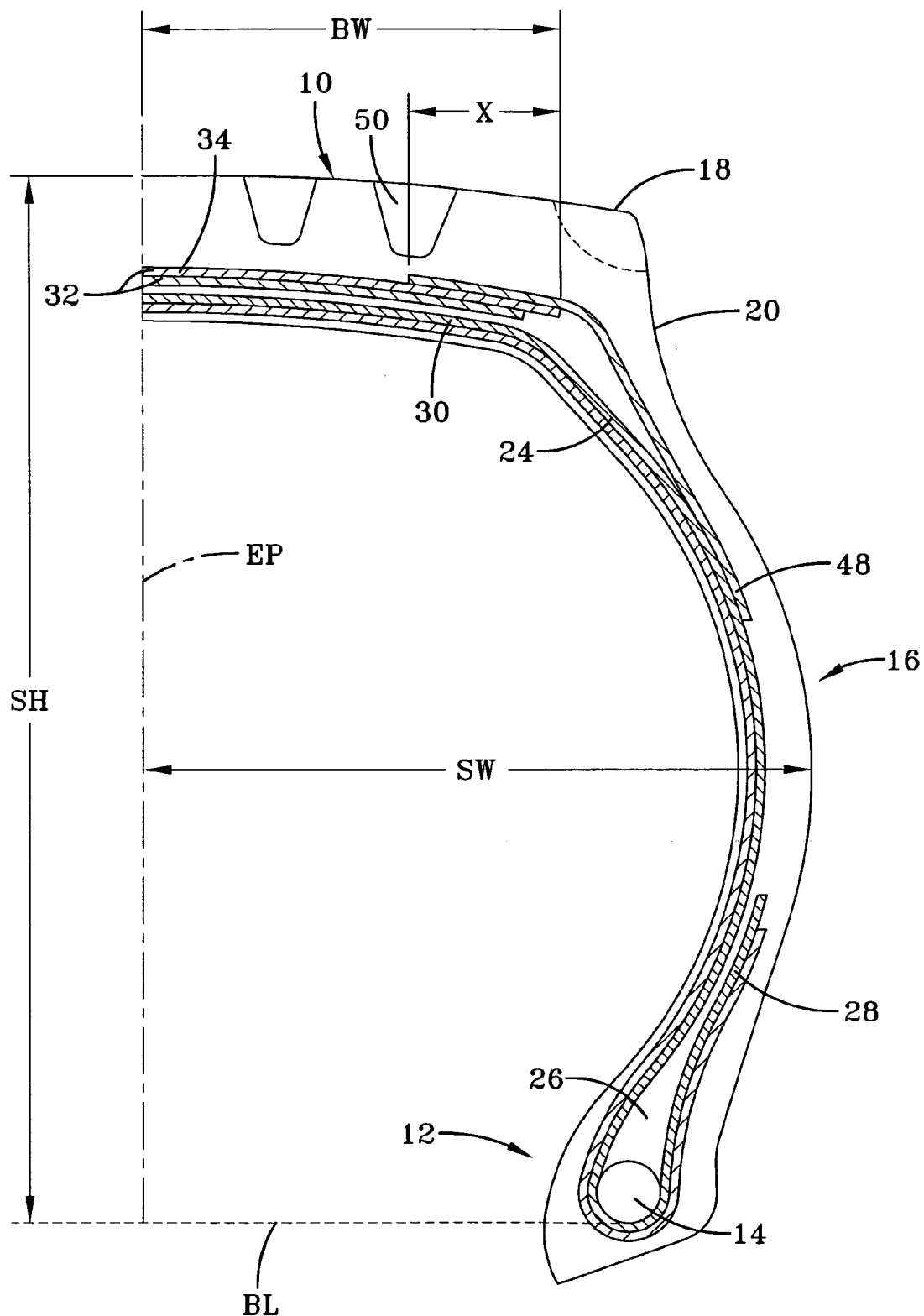
FIGS. 6-8B are alternative embodiments of tires in accordance with the present invention.

FIG. 6 illustrates an embodiment similar to that of FIG. 1; however, the reinforcing ply is split into two reinforcing strips 48 and overlaps the belt package by a distance X from the end of the belt package. The overlap distance X is measured from the axially outermost edge of the belt package. The edge of the belt package, and the belt package width BU., is defined by the axially widest belt ply in the belt package; the widest belt ply may be a working ply, an overlay ply, or an underlay ply as previously discussed. The overlap distance X has a width of 10 to 25% of the belt package width BU. The strip 48 terminates at a high location in the sidewall 16.

The axially inner end of the composite fabric strips 48 are illustrated as being radially outward of the belt plies 34. In this construction, the fabric strips cover the edges of the belt plies 34. Alternatively, while not illustrated, the axially inner end of the composite fabric strips 48 may be located radially inward of the belt plies. In such a construction, the edges of the belt plies 34 lock in and secure the end of the composite fabric strips 48.

Additionally, the strip 48 is shown terminating radially inward of a groove 50 in the tread portion 10. The termination of the strips 48 relative to any grooves 50 is best determined based upon the exact tread pattern to be used. When the strip 48 is located radially inward of the belt package 32, this factor may be irrelevant.

The axially outer, or radially inner, end of the composite fabric strip 48 terminates in a manner similar to the axially outer end of the continuous composite fabric ply 36. The axially outer end of the composite fabric strips 48 may terminate at a distance of 15 to 30% of the SH as measured either way from the maximum section width SW of the tire, terminating radially outward of the maximum section height or radially inward of the maximum section height, adjacent the carcass turnup portions of the carcass. By locating the ends of the ply 36 or strips 48 a defined distance from the maximum section width SW of the tire, a location of high flexibility, stress on the ply or strip end is reduced.

When the composite fabric 38 is applied as reinforcing strips 48 in the shoulders, the fabric 38 is inclined at an angle of 0° to 90° relative to the circumferential direction of the tire. Since the fabric 38 is applied in a smaller area than the plies 36, the inclination angle can be lower as the strips 48 do not inhibit expansion as much as the plies 36. A preferred inclination angle for the fabric 38, when applied as strips 48 is in the range of 10°-45°. The reinforcing strips 36 may be divided into multiple sections along the circumferential length of the tire, with lengths of ½ to ⅙ times the circumferential length of the tire.

Figure 7A:
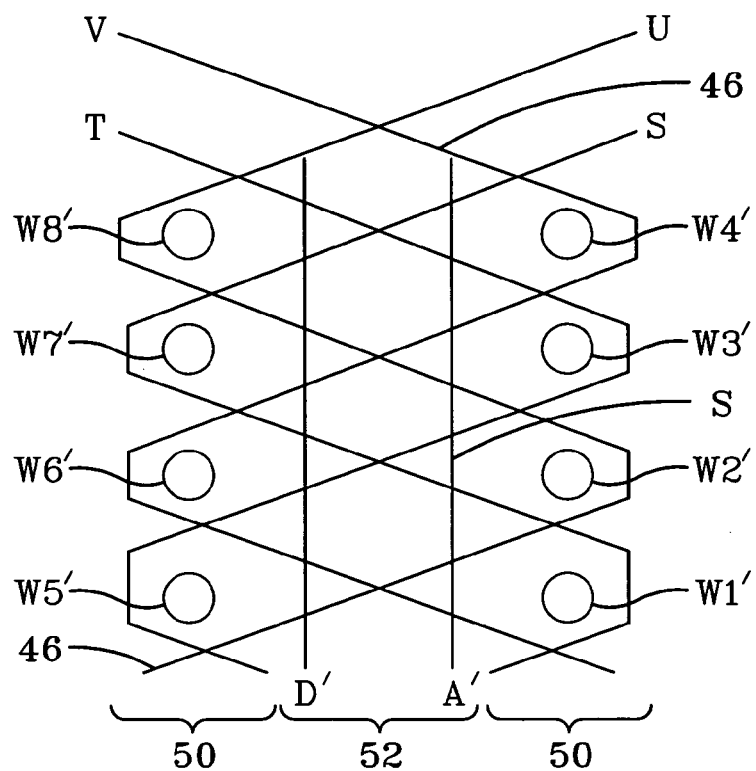
Figure 7B:
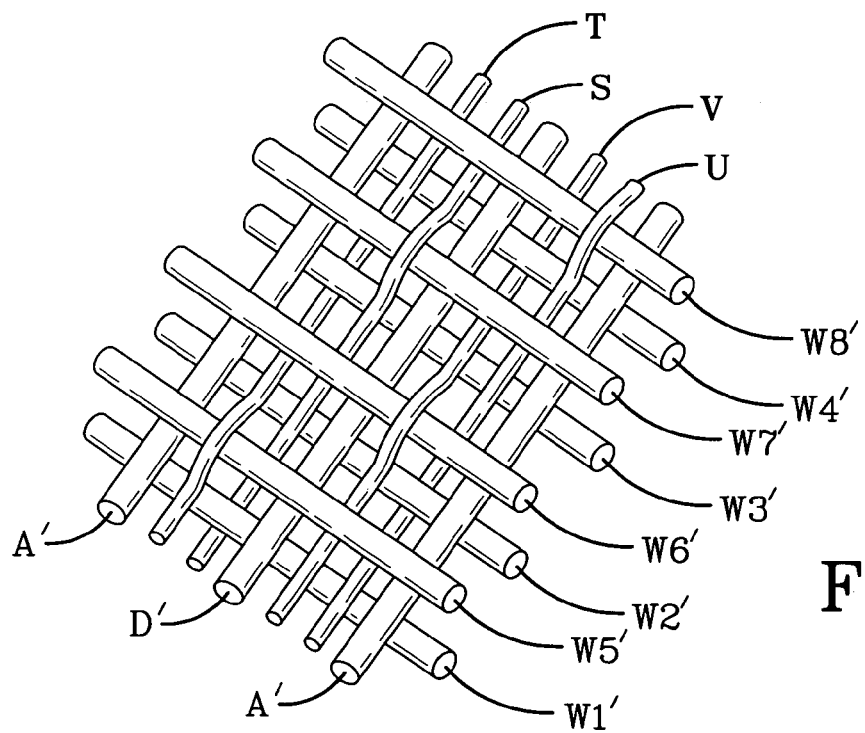

FIGS. 7A and 7B illustrate an alternative fabric construction, FIG. 7A showing the weaving card and FIG. 7B showing an exploded view of the fabric. In this construction, the fabric is still a composite of two outer layers 50 and an intermediate layer 52 wherein the layers 50, 52 are bound together with binder yarns 46. The outer layers 50 are formed of weft yarns W1'-W8'. The intermediate layer 52 is formed of straight warp yarns A', D'. The binder yarns T, S, U, V extend from the first outer layer 50 to the opposing outer layer 50, intimately tying the layers 50, 52 together, causing the three layers to contact each other. This fabric construction is similar to the previous fabric constructions, except the warp yarns of the outer layers are removed to increase the rubber penetration of the fabric.

Samples of fabric were woven and embedded in elastomer and compared to conventional tire reinforcing materials. The fabric sample, woven according to the weave card of FIG. 4, had the following construction elements:

All Warp yarns of layers 40, 42, 44: aramid, 1500/1/3, 6.9 tpi×6.9 tpi;
Binder yarns: nylon, 1260/1/2, 10 tpi×10 tpi;
Weft yarns of layers 40, 42: nylon, 1890/2/2, 5 tpi×6 tpi;
Fabric construction: warp yarns of outer layers @ 16 epi, straight warp @ 8 epi,
binder yarns @ 16 epi, and weft yarns @ 8 epi.

A second fabric sample, with a construction according to the weave card of FIG. 7, had the following construction elements:

Straight warp yarns of layer 52: aramid cords, 1500/1/3, 6.0 tpi×6.9 tpi;
Binder yarns: nylon, 1260/1/2, 10 tpi×10 tpi;
Weft yarns of layer 50: nylon, 1890/2/2, 5 tpi×6 tpi
Fabric construction: straight warp @ 8 epi, binder yarns @ 16 epi, and weft yarns @ 8 epi.
The composite fabric samples were coated with conventional tire elastomeric compounds and both samples exhibited good cord strength and strength retention after fatigue testing.

The composite fabric 38 was also subjected to impact testing. A control sample of a conventional all-terrain vehicle tread compound having a gauge of 0.240" to 0.260" was prepared, and tested against the composite fabric 38 embedded in a tread compound, the embedded fabric having a gauge of 0.280" to 0.290". Both samples were adhered to a common carcass structure comprising plies, the carcass structure having a gauge of 0.070".

The samples were subjected to impact testing. The impact testing was performed on a drop weight impact machine having two different impact heads: a round shaped head of one inch thickness and a chisel shaped head of ⅜ thickness. The drop weight was 207 lbs with a velocity of up to 22 ft/sec, and a drop height of up to 7.5 ft.

The fabric containing sample showed an over 280% improvement on impact resistance than the control sample when impacted with the chisel striker. The fabric sample also showed an over 600% improvement on impact resistance than the control sample when impacted with the round striker.

Any of the fabrics disclosed herein, as shown in FIGS. 2, 4, and 7A may be used in any of the tire constructions illustrated in FIGS. 1, 5, and 6 or as discussed herein in other embodiments.

The illustrated tires of FIGS. 1, 5 and 6 are large off road tire or radial medium tires. For smaller off road tires, such as small ATV tires, the inventive composite fabric 38, 38', when extending completely from one shoulder to the opposing shoulder, may replace any conventional overlay ply. Preferably, a single layer of the composite fabric will replace two layers of an overlay ply.

Figure 8A:
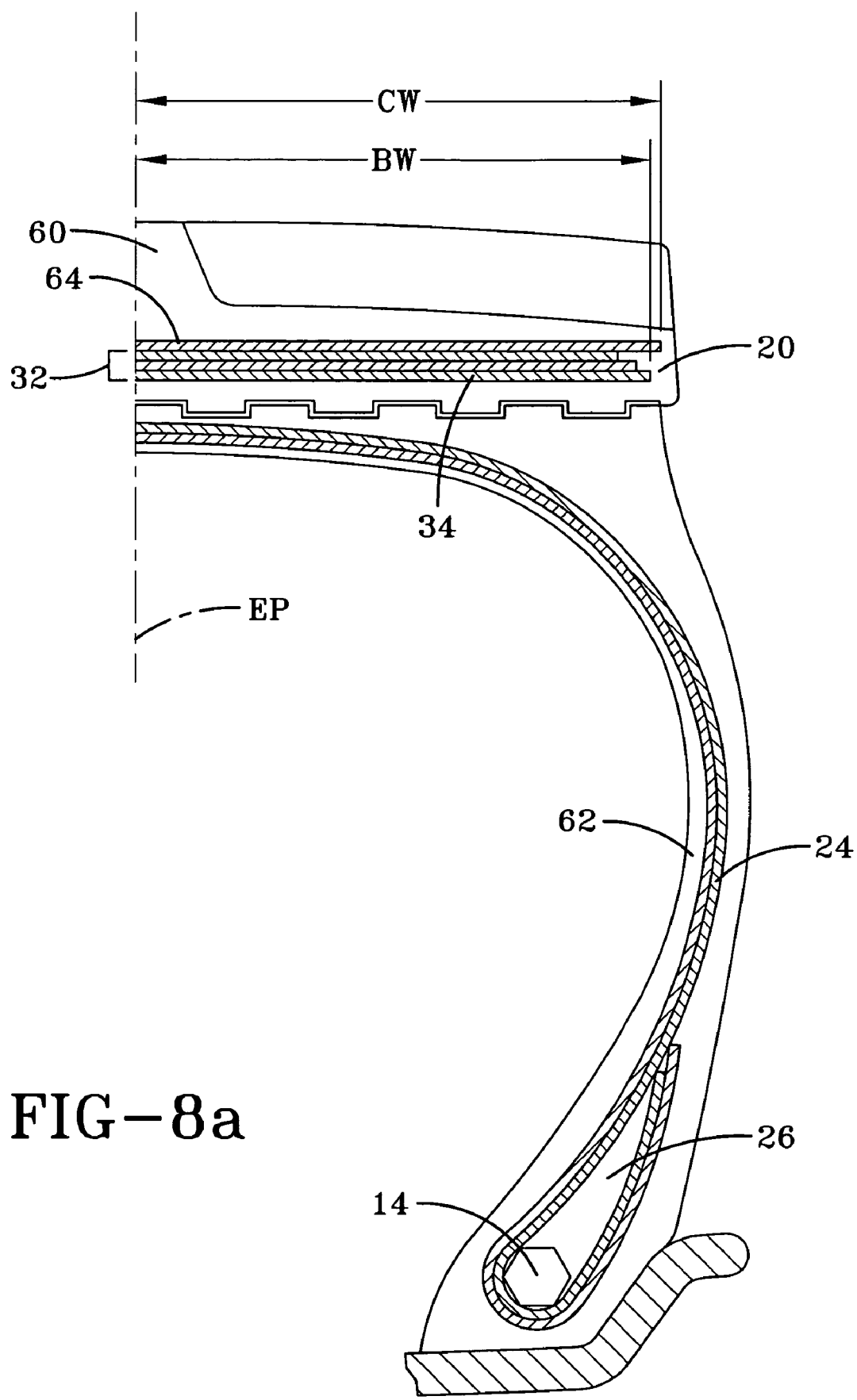

The composite fabric ply may also be used in very large tires, such as the two piece tire illustrated in FIG. 8A. For the purpose of this invention, the assembly of the tread belt 60 and the carcass 62 is a pneumatic tire. The composite fabric ply 64 is radially outward of the belt structure, extending from one tire shoulder 20 to the opposing tire shoulder. The composite fabric ply 64 has a width CW in the range of 60-110% of the belt width BU.

Figure 8B:
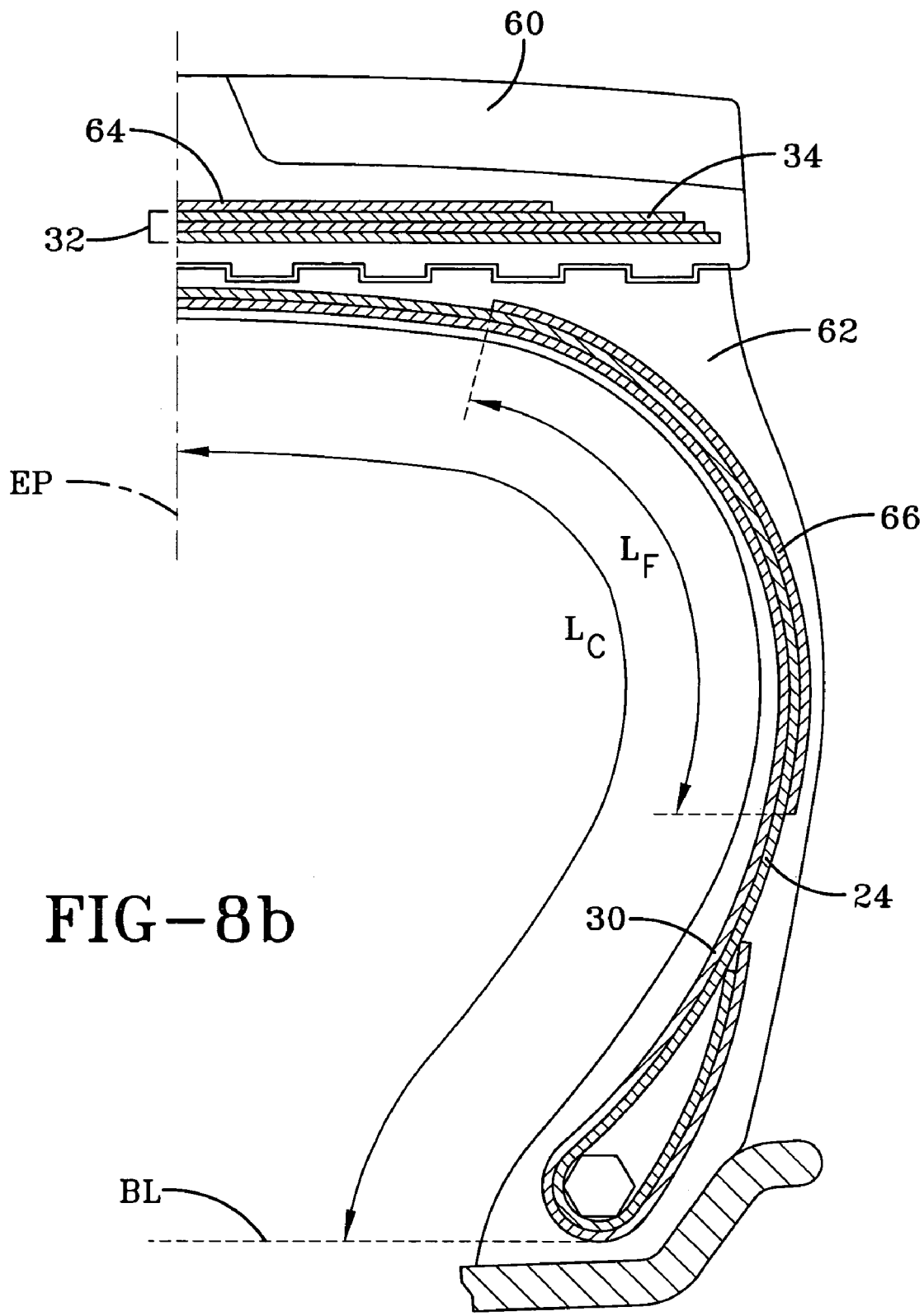

To provide additional cut resistance and reinforcement to the carcass structure, the tire may be provided with composite fabric plies 66 in each tire sidewall adjacent to the carcass reinforcing plies 24, see FIG. 8B. Each composite fabric ply 66 has a length IF in the range of 20 to 45% of the carcass ply length LC, preferably LF is 25 to 40% of LC. Both the composite fabric ply length LF and the carcass ply length LC are measured along the actual ply length, with the carcass ply length measuring only the main carcass portion 30, so the carcass ply length is the measurement of the carcass ply between opposing bead base line BL.

In the tire of FIG. 8B, the composite fabric ply 64 in the tread belt 60 and the composite fabric plies 66 in the carcass axially overlap. This may be desired but is not required in the pneumatic tire to achieve the goals of improved strength and cut resistance.

While not illustrated, in the tire of either FIG. 8A or 8B, the composite fabric ply 64 may be located radially of the belt structure 32. Similar to the above mentioned ATV tires, for the two piece tire wherein the belt structure primarily functions for cut resistance, any of the belt plies 34 may be replaced by a composite fabric ply, even to the limit of replacing all of the belt plies 34 with composite fabric plies. For such a construction, the number of composite fabric plies would be less than or equal to the corresponding number of conventional belt plies 34 being replaced.

What is claimed is:

1. A pneumatic tire comprising a tread portion, a belt package radially beneath the tread portion, a pair of sidewall portions, a pair of shoulder portions with each shoulder portion extending between the tread portion and each sidewall portion, a pair of bead portions with a bead core therein, a carcass comprising at least one carcass ply extending between the bead portions and turnup up around the bead core in each bead portion to form two turnup portions and a main portion therebetween, the tire being characterized by:

a composite fabric ply located between the carcass ply and the belt package in the shoulder portions, the composite fabric ply extending continuously from one shoulder portion to the other shoulder portion, the composite fabric ply having a radially inner end terminating a distance Y from a maximum section width SW of the tire, wherein Y is 5% to 30% of a section height SH of the tire, the composite fabric ply comprising a composite fabric having a first layer, a second layer, and a third layer, the second middle layer comprising a plurality of straight warp yarns, the first, second, and third layers being bound together with binder yarns, the first and third layers of the composite fabric being comprised of warp and weft yarns woven in a twill pattern.

2. The pneumatic tire of claim 1 wherein the straight warp yarns have a cord diameter of 0.25 to 4 mm.

3. The pneumatic tire of claim 1 wherein the layers of the composite fabric are formed of yarns selected from the group consisting of polyester, nylon, aramid, polyethylene terephthalate, polyethylene naphthalate, and blends thereof.

4. The pneumatic tire of claim 1 wherein ends of the composite fabric ply terminate adjacent the turnup portions of the carcass.

* * * * *